2,977,284
Patented Mar. 28, 1961

2,977,284
A-RING AROMATIC Δ⁶-STEROIDS AND THEIR PREPARATION

Eugene J. Agnello and Gerald D. Laubach, Jackson Heights, N.Y., assignors to Chas. Pfizer & Co., Inc., Brooklyn, N.Y., a corporation of Delaware No Drawing. Filed Feb. 3, 1958, Ser. No. 712,631

3 Claims. (Cl. 167—77)

This application is concerned with new and useful therapeutic agents, with a method of preparing these agents and with pharmaceutical compositions containing them. More particularly, it is concerned with certain A-ring aromatic Δ⁶-steroid compounds and with compositions containing these compounds together with pharmaceutically acceptable excipients. It is concerned also with useful intermediates in the preparation of these therapeutically active compounds.

The valuable therapeutically active compounds of this invention include those having the formula

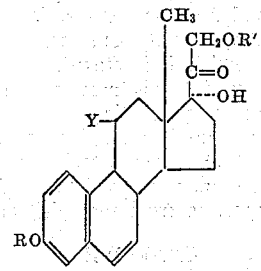

wherein R is an alkyl group containing up to two carbon atoms, that is, methyl or ethyl, R′ is hydrogen or acyl hydrocarbon containing up to twenty carbon atoms and Y is keto or β-hydroxyl. It is also specifically intended to include within the purview of the instant invention 21-esters formed from inorganic acids such as sulfuric, phosphoric, nitric, etc.

Other new compounds which are prepared in the process of this invention and are useful because, by further processing, they are converted to the therapeutically useful compounds of the invention include those having the formula

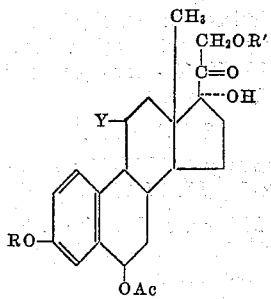

wherein R and R′ have the same meaning as above and Ac is an acetyl group.

A suitable starting compound for the preparation of the valuable compounds of this invention is 19-nor-Δ¹,³,⁵⁽¹⁰⁾ - pregnatriene - 3,11β,17α,21 - tetrol - 20 - one which can be prepared from 19-nor-Δ¹,³,⁵⁽¹⁰⁾,¹⁷⁽²⁰⁾-pregnatetraene-3,11β,21-triol by treatment with acetic anhydride in pyridine followed by treatment of the resulting compound with osmium tetroxide an hydrogen peroxide to give 19-nor-Δ¹,³,⁵⁽¹⁰⁾-pregnatriene-3,11β,17α,21-tetrol-20-one 3,21-diacetate. This compound can be converted to the desired tetrol by alkaline hydrolysis under mild conditions. This starting compound should be converted to a 3-methoxy or 3-alkoxy compound before subjecting the compound to the process of this invention. This can be readily accomplished by known procedures using either diazomethane or diazoethane. The 21-hydroxyl group should be protected, for example, by acylation prior to treatment of the compound with the diazoalkane. Since the 21-hydroxyl group is the only primary alcohol on the molecule, acylation of this group without interference by other hydroxyl groups can be readily carried out by known methods.

The starting compound described above, it will be noted, has a hydroxyl group at the 11β-position. If it is desired to prepare intermediates or therapeutically useful compounds of this invention in which the 11-position has a keto group this can be accomplished in accordance with known oxidative procedures using, for example, chromium trioxide, sodium bichromate, the chromic acid-pyridine complex, N-bromoacetamide and aluminum isopropoxide or aluminum tert-butoxide in the presence of a hydrogen acceptor such as acetone or cyclohexanone in an inert organic solvent such as benzene, toluene or xylene.

Treatment of a 3-alkylated starting compound with lead tetraacetate substitutes the acetoxy group at the 6-position. This group is removed in, for example, hot acetic acid by procedures set forth more fully below to yield the valuable therapeutic agents of this invention.

Application of this reaction to the preparation of 19-nor - Δ¹,³,⁵⁽¹⁰⁾,⁶ - pregnatetraene - 3 - methoxy - 11β,17α, 21-triol-20-one 21-acetate is illustrated in the following equation.

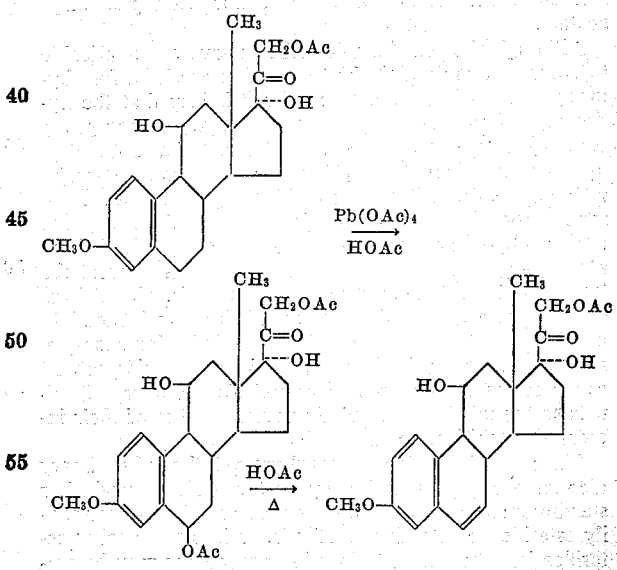

In carrying out the process of this reaction the starting compound is treated with an excess of lead tetraacetate in acetic acid at a temperature of from about 70 to about 100° C. for a period from about 15 minutes to about 3 hours. The amount of solvent, that is, the amount of acetic acid which is used is not critical it being only necessary to use sufficient solvent to bring the reactants into solution. It is preferred to use an excess of lead tetraacetate. An excess of up to 100% is not detrimental but, for most purposes, an excess from about 10 to about 50% provides excellent yields. The preferred temperature is about 90 to 95° C. and in this temperaature range suitable yields are obtained in the preferred time period of from about ½ to about 1 hour.

After this reaction is completed the excess lead tetraacetate is consumed by the addition of a syn-dihydroxy compound, that is, a diol in which the hydroxyl groups are adjacent to each other. It is best to facilitate the destruction of the excess tetraacetate by warming the solution.

The desired 6-acetylated product is obtained by the addition of water to the reaction mixture whereupon the product precipitates. The product is collected by filtration. It may be purified by extraction with a hydrocarbon or halogenated hydrocarbon solvent, for example, petroleum ether, ligroin, ethylene dichloride, chloroform or carbon tetrachloride. The solution is washed with an alkaline reagent, for example, dilute sodium bicarbonate, carbonate or hydroxide and then with water. It is dried over an anhydrous drying agent such as sodium or magnesium sulfate, filtered and the filtrate evaporated to dryness. It is best to remove the solvent in vacuo. The residue which remains after removal of the solvent is recrystallized from a suitable medium, for example, ethyl acetate and the desired product obtained.

The 6-acetoxy compound prepared as described in the previous paragraph is next dissolved in a lower organic acid, that is, one containing up to five carbon atoms. It is preferred to use acetic acid. The solution is heated at a temperature of from about 110° to about 140° C. It is especially convenient to carry out the reaction at the boiling point of acetic acid, that is, 118° at atmospheric pressure. The duration of the reaction is from about 2 hours to about 7 hours, preferably 3 to 4 hours. The 6,7-dehydro product is isolated by precipitation with water and may be purified as set forth above for the 6-acetoxy compound, that is, the precipitate is extracted with a suitable solvent, washed with an alkaline reagent and water, the solution dried and evaporated to leave the desired product as a residue. It may be purified by recrystallization from a solvent, for example, ethyl acetate.

Although the reactions described above are applicable to compounds in which the 21-position carries a free hydroxyl group, for optimum results it is best that the hydroxyl group be acylated with an acyl hydrocarbon group containing up to twenty carbon atoms. The term, "acyl hydrocarbon" includes acyl hydrocarbon groups containing only carbon, hydrogen and oxygen derived from monocarboxylic or dicarboxylic acids. In the event that the acyl hydrocarbon group chosen is one derived from a dicarboxylic acid, it is often advantageous to treat the isolated adrenocortically active compounds with a base derived from an alkali metal or alkaline earth metal to prepare a metal salt. These bases include, for example, sodium, potassium, barium and calcium hydroxide as well as the corresponding carbonates and bicarbonates. Products so prepared are especially useful because of their increased solubility in water.

Since the 21-position hydroxyl group is the only primary alcohol group present in any of the molecules whether starting material, intermediate or product, it may be readily esterified by standard methods. Although Fischer esterification and transesterification procedures may be employed, in general, it is preferred to form the esters by treatment with an acylating agent such as an acyl halide or anhydride in the presence of a tertiary base such as pyridine or dimethylaniline. Free alcohols are prepared from the corresponding esters by gentle hydrolysis, for example, by treatment with dilute hydrogen chloride in aqueous methanol or potassium carbonate in aqueous methanol.

As stated above, it is specifically intended to include within the purview of the instant invention esters formed by reaction between inorganic acids such as sulfuric, sulfurous, phosphoric, phosphorous and nitric and the 21-hydroxyl group on the steroid nucleus. These esters are formed in accordance with standard procedures well known in the art. It will be recognized that certain of these acids contain more than one replaceable hydroxyl group and that in the formation of esters from these acids, the products formed are actually acid esters. These acid esters can be used for the preparation of various alkali and alkaline earth metal salts similar to those prepared with the acid esters of dicarboxylic acids.

The biologically active compounds of this invention may be administered alone or in combination with acceptable pharmaceutical carriers, the choice of which is determined by the preferred route of administration, the solubility of the compound and standard pharmaceutical practice. In general, the dosage of these compounds is of approximately the same order of magnitude as the dosage of hydrocortisone, and these compounds are useful to treat the types of pathological conditions often treated with hydrocortisone. Because of their great adrenocortical activity it is sometimes possible to use dosages of these compounds which are lower than those of hydrocortisone.

For oral administration the compounds may be administered in the form of tablets containing excipients such as starch or milk sugar. Aqueous suspensions and elixirs which may be sweetened or flavored may also be used. To apply these therapeutic agents topically, they may be prepared in the form of ointments and salves in suitable bases especially non-aqueous petrolatum type bases. For intra-articular injection aqueous suspensions may be employed. In this case various suspending and wetting agents may be added to the compositions to obtain a suspension not tending to settle out easily or to pack down in the bottle in which it is stored. Intramuscular and subcutaneous dosage forms may also be prepared by standard pharmaceutical practice.

The following examples are given solely for the purpose of illustration and are not to be construed as limitations of this invention, many variations of which are possible without departing from the spirit or scope thereof.

EXAMPLE I 3-methoxy-$\Delta^{1,3,5(10)}$-19-nor-pregnatriene-20-keto-11$\beta$,17$\alpha$,21-triol 21-acetate $\Delta^{1,3,5(10)}$-19 - nor - pregnatriene-20-keto-3,11$\beta$,17$\alpha$,21-tetrol was prepared in accordance with the procedure described in the Journal of the American Chemical Society, vol. 79, p. 1509, and acetylated using acetic anhydride to produce the 21-acetate. This compound (2 g.) was taken up in 35 cc. of ether and treated with an excess of a saturated solution of diazomethane in ether at —5° C. The mixture was allowed to stand for four hours and the solvent and excess diazomethane removed in vacuo. The residue was recrystallized using 1:1 ether ethyl acetate and the desired product obtained.

The process was repeated using diazoethane to prepare 3-ethoxy-$\Delta^{1,3,5(10)}$-19 - nor - pregnatriene - 20 - keto-11$\beta$,17$\alpha$,21-triol 21-acetate.

EXAMPLE II 3-methoxy-6-acetoxy-$\Delta^{1,3,5(10)}$-19-nor-pregnatriene-20-keto-11$\beta$,17$\alpha$,21-triol 21-acetate A mixture of 500 mg. of 3-methoxy-$\Delta^{1,3,5(10)}$ - 19-nor-pregnatriene - 20 - keto - 11$\beta$,17$\alpha$,21-triol 21-acetate and 1 g. of lead tetraacetate in two ml. of acetic acid was heated with stirring at 70° C. for three hours. At the end of this period the excess tetraacetate was destroyed by the addition of 3 cc. of ethylene glycol. The product was then precipitated by the addition of water and the precipitate recovered by filtration. The precipitate was extracted with chloroform and the chloroform extract washed first with 5% sodium bicarbonate solution and then with water. It was dried over anhydrous sodium sulfate, the drying agent removed by filtration and the filtrate evaporated to dryness. The residue was recrystallized from ethyl acetate and the desired product obtained by filtration.

EXAMPLE III

*3-ethoxy-6-acetoxy-$\Delta^{1,3,5(10)}$-19-nor-pregnatriene-20-keto-11β,17α,21-triol 21-acetate*

A mixture of 500 mg. of 3-ethoxy-$\Delta^{1,3,5(10)}$-19-nor-pregnatriene - 20 - keto - 11β,17α,21-triol 21-acetate and 1.5 g. of lead tetraacetate in two ml. acetic acid was heated with stirring at 100° C. for fifteen minutes. At the end of this period the excess tetraacetate was destroyed by the addition of 3 cc. of ethylene glycol. The product was then precipitated by the addition of water and the precipitate recovered by filtration. The precipitate was extracted with ethylene dichloride and the ethylene dichloride extract washed first with 5% sodium bicarbonate solution and then with water. It was dried over anhydrous sodium sulfate, the drying agent removed by filtration and the filtrate evaporated to dryness. The residue was recrystallized from ethyl acetate and the desired product obtained by filtration.

EXAMPLE IV

*3-methoxy-6-acetoxy-$\Delta^{1,3,5(10)}$-19-nor-pregnatriene-20-keto-11β,17α,21-triol 21-acetate*

3 - methoxy - 6 - acetoxy-$\Delta^{1,3,5(10)}$-19-nor-pregnatriene-20-keto-11β,17α,21-triol 21-acetate (1 g.) was taken up in 10 cc. of methanol. The methanol solution was mixed with an equal volume of an aqueous 10% potassium carbonate solution and the mixture stirred for one hour under a nitrogen atmosphere. The desired 21-alcohol was precipitated by the addition of sodium chloride and recovered by filtration.

EXAMPLE V

A variety of esters of the 21-alcohol prepared as described in the previous example were prepared by treating the free alcohol with acylating agents by conventional methods. These included such compounds as the formate, the acetate, the isobutyrate, the hexanoate, the benzoate, the octanoate, the stearate, the undecanoate, the hemigluconate, the trimethyl acetate, the cyclohexylcarbonate, the cyclopentylpropionate, etc. The acid esters of dicarboxylic acids such as the hemisuccinate have the advantage that the alkali metal and alkaline earth metal salts can be prepared from them by treating with molar proportions of a base such as sodium or potassium bicarbonate or barium hydroxide.

EXAMPLE VI

The procedures of Examples IV and V were repeated using the compound prepared as described in Example III to prepare the corresponding ethoxy compounds.

EXAMPLE VII

*3-methoxy-$\Delta^{1,3,5(10),6}$-19-nor-pregnatetraene-20-keto-11β,17α,21-triol 21-acetate*

3-methoxy-6-acetoxy-$\Delta^{1,3,5(10)}$ - 19 - nor-pregnatetraene-20-keto-11β,17α,21-triol 21-acetate (1 g.) was dissolved in 5 ml. of acetic acid and heated with stirring at 110° for seven hours. The desired product was precipitated by the addition of water and recovered by filtration. The precipitate was extracted with chloroform, the organic extract washed with sodium bicarbonate and then with water. It was dried over anhydrous sodium sulfate, the drying agent removed by filtration and the filtrate evaporated to dryness. The desired product was obtained in crystalline form by recrystallization from ethyl acetate. Its ultraviolet spectrum in 1% ethanol showed a peak at 226 and 264 mμ (ε=30,000 and 11,000 respectively).

EXAMPLE VIII

*3-ethoxy-$\Delta^{1,3,5(10),6}$-19-nor-pregnatetraene-20-keto-11β,17α,21-triol 21-acetate*

3-ethoxy-6-acetoxy-$\Delta^{1,3,5(10)}$ - 19-nor-pregnatetraene-20-keto-11β,17α,21-triol 21-acetate (1 g.) was dissolved in 5 ml. of valeric acid and heated with stirring at 140° C. for two hours. The desired product was precipitated by the addition of water and recovered by filtration. The precipitate was extracted with ethylene dichloride, the organic extract washed with sodium bicarbonate and then with water. It was dried over anhydrous sodium sulfate; the drying agent removed by filtration and the filtrate evaporated to dryness. The desired product was obtained in crystalline form by recrystallization from ethyl acetate. Its ultraviolet spectrum in 1% ethanol showed a peak at 226 and 264 mμ (ε=30,000 and 11,000 respectively).

EXAMPLE IX

The free 21-alcohols of the products prepared in Examples VII and VIII were each prepared by hydrolysis of the ester using one molar portion of potassium carbonate in 10% aqueous methanol solution. The mixture was stirred at room temperature for one hour and then poured into ice water to precipitate the free alcohols.

EXAMPLE X

A variety of esters of the 21-alcohols prepared as described in the previous example were prepared by acylating the free alcohols in accordance with conventional methods. These included such compounds as the formate, the acetate, the isobutyrate, the hexanoate, the benzoate, the octanoate, the stearate, the undecanoate, the hemigluconate, the trimethyl acetate, the cyclohexylcarbonate, the cyclopentylpropionate, etc. The acid esters of dicarboxylic acids such as the hemisuccinate have the advantage that alkali metal and alkaline earth metal salts can be prepared from them by treating with molar proportions of a base such as sodium or potassium bicarbonate or barium hydroxide. These salts, in addition to being biologically active, are water soluble, an advantage not possessed by the 21-position steroid alcohols themselves or by ordinary esters thereof.

EXAMPLE XI

*3-methoxy-$\Delta^{1,3,5(10)}$-19-nor-pregnatriene-11,20-diketo-17α,21-diol 21-acetate*

To a solution of 5 g. of 3-methoxy-$\Delta^{1,3,5(10)}$-19-nor-pregnatriene-20-keto-11β,17α,21-triol 21-acetate in 25 ml. of glacial acetic acid was added 15 ml. of solution of chromium trioxide in 9:1 acetic acid-water solution containing 76 mg. of chromium trioxide per ml. of solution. The mixture was kept at room temperature during the addition and for an additional four hours. The desired compound was precipitated by the addition of water and recrystallized from methanol-chloroform.

The procedure of Example XI was repeated to prepare the following compounds.

3-methoxy-6-acetoxy-$\Delta^{1,3,5(10)}$-19-nor - pregnatriene - 11, 20-diketo-17α,21-diol 21-acetate
3-ethoxy-6-acetoxy-$\Delta^{1,3,5(10)}$-19-nor-pregnatriene - 11,20- diketo-17α,21-diol 21-acetate
3-methoxy - $\Delta^{1,3,5(10),6}$-19 - nor - pregnatetraene - 11,20- diketo-17α,21-diol 21-acetate
3-ethoxy-$\Delta^{1,3,5(10),6}$-19-nor-pregnatetraene-11,20 - diketo-17α,21-diol 21-acetate

EXAMPLE XII

The free 21-alcohols of the products prepared in Example XI were each prepared by hydrolysis of the ester using one molar portion of potassium carbonate in 10% aqueous methanol solution. The mixture was stirred at room temperature and then poured into ice water to precipitate the free alcohols.

EXAMPLE XIII

A variety of esters of the 21-alcohols prepared as described in the previous example were prepared by acylating the free alcohols in accordance with conventional methods. These included such compounds as the formate, the acetate, the isobutyrate, the hexanoate, the benzoate, the octanoate, the stearate, the undecanoate, the hemigluconate, the trimethyl acetate, the cyclohexylcarbonate, the cyclopentylpropionate, etc. The acid esters of dicarboxylic acids such as the hemisuccinate have the advantage that alkali metal and alkaline earth metal salts can be prepared from them by treating with molar proportions of a base such as sodium or potassium bicarbonate or barium hydroxide.

EXAMPLE XIV

Sulfate esters

The sulfate esters of the free alcohols prepared as in Examples IX and XII were each synthesized from pyridine-sulfur trioxide using the following method.

The selected compound was taken up in dry pyridine and an excess of pyridine-sulfur trioxide was added. The mixture was vigorously stirred under nitrogen for four and one-half hours at 50° C. It was then poured into an excess of aqueous saturated barium carbonate and the precipitated barium sulfate removed by filtration. The aqueous solution was adjusted to pH 4 using aqueous sulfuric acid and the acid mixture extracted with chloroform. The chloroform solution was dried over anhydrous sodium sulfate, filtered, the solvent removed in vacuo and the residue recrystallized from ethyl acetate to yield the desired product. The sulfate acid ester has the advantage that alkali metal salts and alkaline earth metal salts can be prepared from it by treating with molar proportions of a base such as sodium or potassium bicarbonate or barium hydroxide. These salts are water soluble, an advantage not possessed by the 21-position steroid alcohols themselves or by ordinary esters thereof.

EXAMPLE XV

Nitrate esters

The 21-iodides of the free alcohols prepared in the previous examples were synthesized by standard methods which included first converting the alcohols to the tosylates and treating the tosylates with sodium iodide. These compounds were converted to 21-nitrates by the following procedure.

The 21-iodide was taken up in an acetonitrile solution containing a slight excess of silver nitrate. The mixture was stirred under nitrogen for one hour and filtered to remove the precipitated silver iodide. The acetonitrile was removed in vacuo to obtain the desired product.

EXAMPLE XVI

Phosphate esters

The 21-phosphate of each of the free alcohols prepared as described in the previous examples was synthesized by converting the corresponding iodide compounds to dibenzyl phosphates in accordance with the procedure described in United States Patent No. 2,789,117, issued April 16, 1957. The benzyl groups were removed by hydrogenation in N-methyl morpholine in accordance with the procedure described in this same patent. The phosphate acid ester has the advantage that alkali metal salts and alkaline earth metal salts can be prepared from it by treating with molar proportions of a base such as sodium or potassium bicarbonate or barium hydroxide. These salts are water soluble, an advantage not possessed by the 21-position steroid alcohols themselves or by ordinary esters thereof.

What is claimed is:

1. A compound selected from the group consisting of

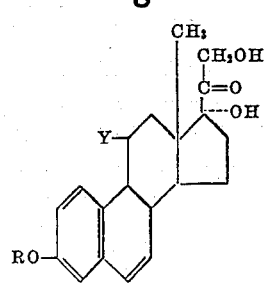

wherein R is selected from the group consisting of methyl and ethyl and Y is selected from the group consisting of keto and β-hydroxy; 21-position esters thereof with a monocarboxylic acid; 21-position acid esters thereof with a dicarboxylic acid, said mono and dicarboxylic acids containing only carbon, hydrogen and oxygen up to a total of twenty carbon atoms; 21-position esters thereof with inorganic acids; 21-position acid esters thereof with inorganic acids containing more than one replaceable hydroxyl group; and alkali metal and alkaline earth metal salts of said acid esters.

2. A process for the preparation of an alkali and alkaline earth metal free compound of claim 1 which comprises treating a compound selected from the class consisting of those having the formula

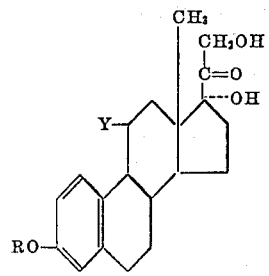

wherein R is selected from the group consisting of methyl and ethyl and Y is selected from the group consisting of keto and β-hydroxyl; 21-position esters thereof with a monocarboxylic acid, 21-position acid esters thereof with a dicarboxylic acid, said mono and dicarboxylic acids containing only carbon, hydrogen and oxygen up to a total of twenty carbon atoms; 21-position esters thereof with inorganic acids and 21-position acid esters thereof with inorganic acids containing more than one replaceable hydroxyl group, with up to a 100% excess of lead tetraacetate in acetic acid for a period of from 15 minutes to 3 hours at a temperature of from about 70° to about 100° C. and consuming the excess lead tetraacetate by the addition of a syn-diol; precipitating the resulting compound by the addition of water; heating the resulting compound in a lower organic acid solvent containing up to 5 carbons at a temperature of from about 110° to about 140° C. for a period of from about 2 to about 7 hours and precipitating the resulting compound by the addition of water.

3. A pharmaceutical composition comprising a compound as claimed in claim 1 together with a pharmaceutically acceptable carrier.

References Cited in the file of this patent

UNITED STATES PATENTS

| | | |
|---|---|---|
| 2,332,815 | Ruzicka | Oct. 26, 1943 |
| 2,520,656 | Reichstein | Aug. 29, 1950 |
| 2,666,769 | Colton | Jan. 19, 1954 |
| 2,670,357 | Murray et al. | Feb. 23, 1954 |
| 2,816,902 | Gould et al. | Dec. 17, 1957 |
| 2,840,581 | Hogg et al. | June 24, 1958 |
| 2,847,428 | Clarke | Aug. 12, 1958 |

OTHER REFERENCES

Magerlein et al.: J. Am. Chem. Soc., vol. 79 (March 20, 1957), pages 1508 and 1509.